AUTOMATIC LIGHT INTENSITY COMPENSATOR

Filed March 20, 1959

INVENTOR.
T. F. MACALL
BY E. H. Suydam
AGENT

United States Patent Office 3,069,495

Patented Dec. 18, 1962

3,069,495

AUTOMATIC LIGHT INTENSITY COMPENSATOR

Thomas Ferdinand Macall, Panorama City, Calif., assignor to International Telephone and Telegraph Corporation, New York, N.Y., a corporation of Maryland Filed Mar. 20, 1959, Ser. No. 800,747
6 Claims. (Cl. 178—7.2)

My invention relates to the automatic adjustment of control circuits of television cameras. In particular it relates to improved circuit arrangements and to camera lens housing structures whereby an improved quality of the televised picture is automatically maintained over a wide range of light intensities of scenes being televised without readjustment of camera voltage controls.

The preferred embodiment of my invention will be described as applied to the camera tube known as the Vidicon although it is to be understood that the principles involved are applicable to camera tubes of other types, e.g. the Image Orthicon.

The principle of operation of the Vidicon is well known. It is based on the principle of photoconductivity. Photoconductivity is that electrical property possessed by some substances which causes them to change their electrical conductivity as the incident light intensity varies. The inside surface of a Vidicon faceplate is coated with a thin film of light transparent conductive material. Over the film is applied a thin layer of a photoconductive substance. This substance, when dark, is a reasonably good insulator but becomes slightly conductive when illuminated. When an object is imaged on the photoconductive surface the latter may be considered as a mosaic of parallel elements or paths each having the characteristic of a leaky capacitor which accumulates a charge having a value dependent on the intensity of the incident light falling on each element of the mosaic. As the electron beam scans the surface the beam current sequentially discharges each capacitor of the mosaic and a capacitive current flows through an external circuit including a load resistance across which is developed the video output voltage.

It is obvious that a primary factor that contributes to the amplitude of the video output voltage is the image light intensity. One method of maintaining the video output voltage substantially constant regardless of variation in light intensity of the image is to apply to a control electrode of the camera tube a compensating voltage which varies inversely to the average light intensity. In the preferred embodiment of my invention the target electrode is the control electrode.

The main object of my invention is to develop a controlling or compensating potential—preferably one which is independent of ambient light and, when applied to a control electrode, will produce a correction of the target voltage to maintain the video output voltage substantially constant regardless of the light intensity of the image. The desired values of the average beam current and the target voltage are considered to be those values which result in the monitored picture most pleasing to the eye of the video control operator.

It is known that such a compensating voltage can be developed through the use of photoelectric cells positioned so as to be responsive to the average light intensity of the scene being televised. By producing a compensating voltage which varies as a function of the photocell conductivity with light intensity and applying the voltage to a control electrode of a video amplifier tube a greatly improved video signal has been obtained as compared with a signal obtained by the use of manual controls. The compensating voltage has also been used to control the iris in a camera optical system. Also, the methods of iris control and of electrode voltage control have been employed jointly in a unitary control.

However, the known methods of light intensity compensation are also responsive to ambient light as well as to the incident light from the scene being televised. The response of the photoelectric cells to ambient light is an undesirable result of known systems and one of the main objects of my invention is to provide a new method and structure which will prevent the photoelectric cells from being so responsive. Other objects are:

To provide an automatic light intensity compensator in which the control or compensating voltage is applied to a control electrode of the camera tube.

To provide, in an automatic light intensity compensator, photocells which are shielded from substantially all extraneous light except that which is reflected from the image for whose variation in light intensity it is desired to compensate.

To provide a housing structure which will assure that the light from the scene being imaged on the photosensitive surface of the camera tube comes primarily from that scene and not from light that might find its way to the surface from sources outside the desired field of view.

To provide an electrical network including photocells in combination with the housing structure of my invention in order that the photocells are substantially under the sole influence of light reflected from the image of the scene being televised.

The above-mentioned and other features and objects of this invention will become apparent by reference to the following description taken in conjunction with the accompanying drawing, wherein.

Figure 1:
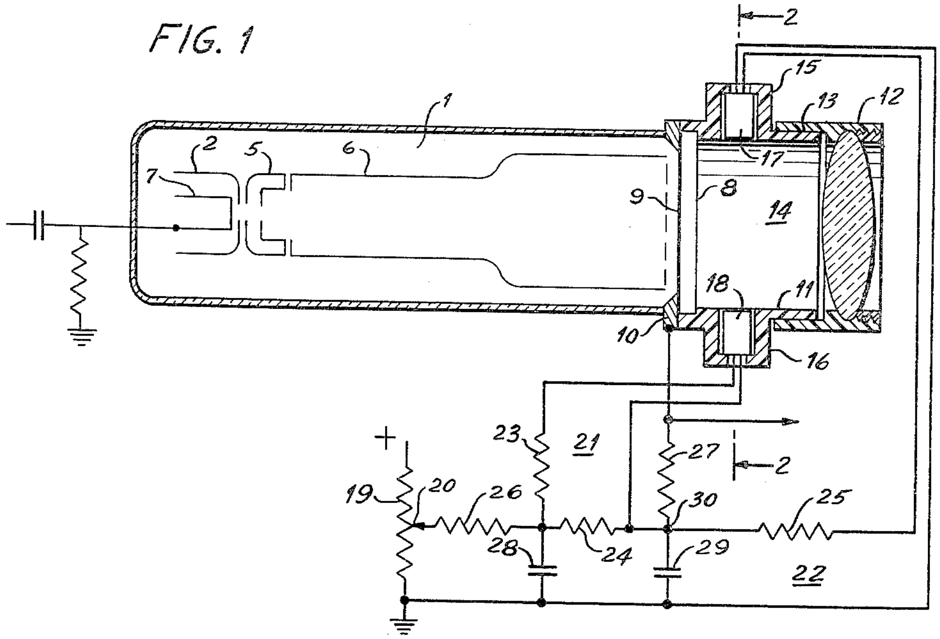
FIG. 1 is a diagram showing schematically a Vidicon television camera tube together with circuitry and lens housing for developing the compensating voltage in accordance with my invention.

Referring to FIG. 1, reference numeral 1 is a schematic sectional view of a Vidicon television camera tube. Various electrodes of the tube are represented as follows: 7—the unipotential cathode; 2—the No. 1 or beam control grid; 5—the No. 2 grid; 6—the anode; and 9—the signal or target electrode.

The faceplate 8 has deposited on its inner face the thin transparent conductive film and the target or signal electrode 9, the latter being in electrical contact with the target or signal electrode connection 10.

Positioned in front of the faceplate is a housing 11 for mounting the camera lens system 12 and a plurality of photoelectric cells the function of which will be described presently. Means for focusing an image on target electrode is indicated schematically by the sliding cylindrical surface 13 between the mounting and the lens system.

The enclosure 14, bounded by the faceplate 8, the mounting 11 and the lens system 12, should be designed so as to exclude substantially all light except that which enters through the optical system. Means, not shown, may be provided for ventilating the enclosure to prevent an excessive temperature rise of the target electrode. However, the means provided should be such as to exclude light from the enclosure. An infra-red filter may also be included in the optical system to reduce the temperature of the target electrode.

Of the light composing the image, some will be absorbed in the photoconductive surface and some will be reflected back into the enclosure 14. Light also will be reflected from the front surface of the faceplate 8. Some light also will be reflected from the walls of the enclosure but it is preferred that such reflected light be minimized by providing the enclosure with a block matt surface. In the specification and claims, whenever reference is made to the reflected light from the image or from the target electrode it is to be understood that said reflected light includes the light from the faceplate.

Figures 2, 3:
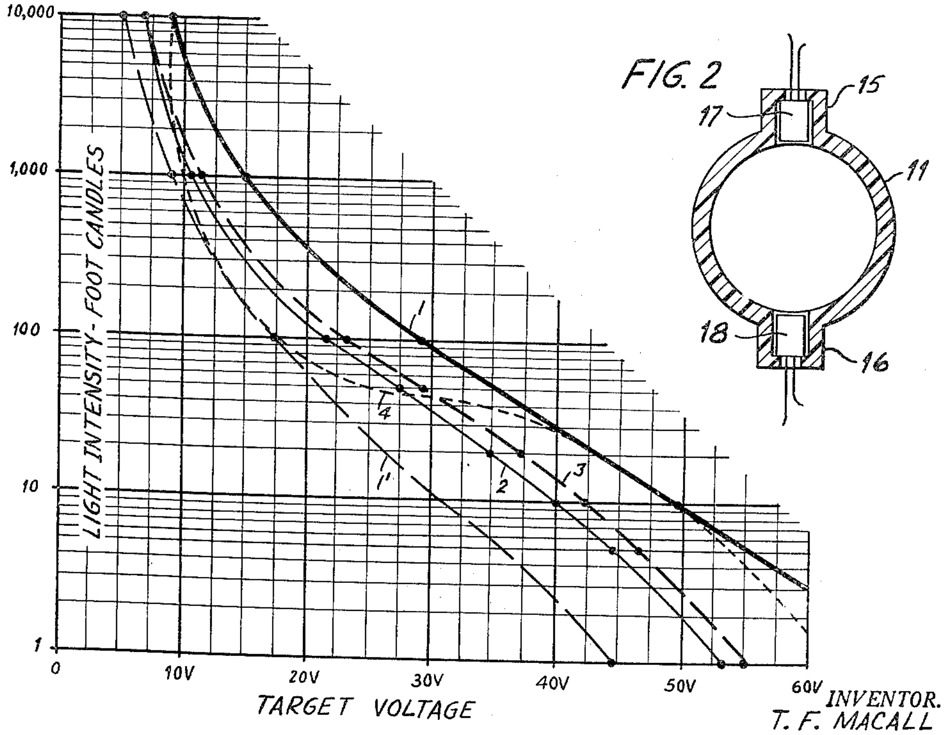
FIG. 2 is taken through section 2—2 of FIG. 1.
FIG. 3 is a set of curves illustrating my invention.

Two oppositely disposed protrusions 15 and 16 are shown in both FIGS. 1 and 2. Photoelectric cells 17 and 18 are mounted within the protrusions 15 and 16 respectively with their axes substantially perpendicular to the axis of the Vidicon. The purpose of so positioning the photocells is to ensure that they will be responsive primarily to the average reflected light within the enclosure. If they were positioned so as to directly face the image there is the possibility that they might produce undesirably high compensating voltages as the result of unusually brilliant spots of considerable light intensity appearing on the image, such as for example, sunlight reflected from the windshields of automobiles or from jewelry worn by performers. It has been found that making the photocells responsive to the average light within the enclosure produces a considerably improved televised picture as compared with those televised by the known methods referred to above.

For simplification of the drawings FIGS. 1 and 2 show the use of only two photoelectric cells in illustrating my invention. Depending on the characteristics of the cells it will be evident that more than two cells might be used and connected in either series or parallel combinations with the circuitry which will now be described.

FIG. 1 shows a potentiometer 19 connected across a direct current source of potential. The network extending from the adjustable tap 20 of the potentiometer to the target electrode connection 10 determines the voltage applied to the target. This network includes the photocells 17 and 18 and, as the conductance of the photocells varies in accordance with the reflected light from the image, the target potential will be automatically adjusted so as to maintain substantially constant the average value of the video output signal.

The network comprises two circuits 21 and 22. Circuit 21 comprises one photoelectric cell 18 connected in series with a resistor 23, the series combination being in parallel with the resistor 24. Circuit 22 comprises a photoelectric cell, or cells, 17 in series with a resistor 25. The series combination of circuits 21 and 22 and the resistor 26 is connected between the adjustable tap of the potentiometer and ground and may be considered a voltage divider which supplies the compensating voltage to the target electrode through the load resistor 27. The output video voltage appears across the load resistor. The capacitors 28 and 29 produce a filtering action in order that voltages resulting from rapid changes in the instantaneous light intensity of the image will not appear in the compensating voltages.

It will be observed from the position of the photocells in the branch circuits 21 and 22 of FIG. 1 that changes in light intensity cause the cells to produce opposite voltage variations at the point 30 from which the target voltage is applied. For example, if there is an increase in the average light intensity of the image, a corresponding increase in the conductivity of the photoelectric cell 18 in branch 21 will produce a decrease in the voltage applied to the target electrode. A similar increase in the conductivity of the photoelectric cell 17 associated with branch 22 will cause an increase in the target voltage. The resultant target voltage is such as to maintain substantially constant the video output voltage and the optimum picture quality.

The manner of connecting photoelectric cells in various circuit combinations can be greatly extended as compared with the simple illustration shown in FIG. 1. For example, photoelectric cells may be applied whose responses not only vary with different light intensities but also with lights of different color. It is frequently desirable, for example, in industrial television, to have the televised response of a given object entirely different from the response of the human eye. In such cases photoelectric cells sensitive to infra-red light are frequently used.

By a suitable choice of electrical values for the resistors, capacitors and photoelectric cells of the network, the opposite voltage variations mentioned above may be employed to obtain a curve of light intensity versus target voltage response for automatic control of the target voltage which will match very closely a response curve obtained by the optimum manual adjustment of the target voltage. Once the desired network has been selected, it remains fixed. The operator may manually adjust the target voltage for any value of light intensity and he will be assured that it also will assume automatically the proper voltage throughout the range of light intensity values.

In the modification of my invention as above described the target or signal electrode was considered as the control electrode on which the compensating voltages were impressed. Circuits similar to those described could also be used to impress compensating voltages on other Vidicon electrodes, for example, electrode 2, the No. 1 grid.

To illustrate the results which have been obtained with the circuits and structure of my invention reference is made to the curves shown on FIG. 3. The curves are shown in semi-log Cartesian co-ordinates in the conventional manner and show the target voltage in volts versus light intensity in foot-candles under various conditions of adjustment.

A Vidicon was used as the camera tube. The photoelectric cells used and the electrical values of the resistors were as follows.

| | |
|---|---|
| Photoelectric cell **17** (two cells in parallel) | CL 4 Clairax. |
| Photoelectric cell **18** (two cells in parallel) | CL 4 Clairax. |
| Resistor **23** | 3.9 megohms. |
| Resistor **24** | 560 kilohms. |
| Resistor **25** | 100 kilohms. |
| Resistor **26** | 33 kilohms. |
| Resistor **27** | 56 kilohms. |

Curves 1 and 1' indicate respectively the highest and lowest target voltage variations producing substantially the same picture quality. The curves vary because individual Vidicons may require different target voltages for the same image light intensity even though they have similar performance characteristics and operate with the same dark current.

Curve 2 shows the best target voltages when they are manually adjusted for an optimum picture.

Curve 3 shows target voltages under automatic control when using two photocells 17 and one photocell 18.

Curve 4 shows target voltages under automatic control but when using two photocells 17 only. The curve is shown for comparison with curve 3. The superior operation as indicated by curve 3 is very marked.

While I have described above the principle of my invention in connection with specific apparatus, it is to be clearly understood that this description is made only by way of example and not as a limitation to the scope of my invention as set forth in the objects thereof and in the accompanying claims.

What is claimed is:

1. An automatic light intensity compensator for maintaining substantially constant the video output voltage of a camera tube having a photosensitive surface and a control electrode comprising: optical means for focusing on said photosensitive surface an image of an object of varying light intensity; a plurality of photosensitive means disposed in a light communication relationship with said photosensitive surface responsive to the intensity of the light reflected from said image; control means including said plurality of photosensitive means for developing a control voltage and means for applying said control voltage to said control electrode.

2. An automatic light intensity compensator in accordance with claim 1 further comprising means for excluding from said photosensitive surface and said plurality of photosensitive means all extraneous light except that which passes through said optical means.

3. An automatic light intensity compensator in accordance with claim 1 wherein said photosensitive surface is contiguous with the surface of said control electrode.

4. An automatic light intensity compensator for maintaining substantially constant the video output voltage of a television camera tube having a photosensitive surface and a control electrode comprising: an optical system for focusing on said photosensitive surface the image of the object being televised; a plurality of photocells; shielding means enclosing said photosensitive surface, said photocells and said lens system to provide an enclosure substantially free from extraneous light; means for positioning said photocells within said enclosure to be responsive to the intensity of the light reflected from said image; a voltage source; and circuit means interconnecting said voltage source, said photocells and said photosensitive surface whereby the voltage applied to said control electrode from said source is responsive to the conductivity of said photocells to maintain substantially constant said video output voltage.

5. An automatic light intensity compensator according to claim 4, in which said circuit means comprises: a load circuit; a resistive voltage divider connected across said voltage source; means for connecting a point on said voltage divider to said target electrode through said load, and means for connecting at least one of said photocells to said voltage divider on each side of said point.

6. An automatic light intensity compensator according to claim 5 in which said means for connecting at least one of said photocells to said voltage divider includes a first circuit means for connecting one of said photocells in parallel relation with one resistive portion of said resistive divider and a second circuit means for connecting another of said photocells in series relation with another resistive portion of said resistive divider.

References Cited in the file of this patent

UNITED STATES PATENTS

| | | |
|---|---|---|
| 2,134,851 | Blumlein | Nov. 1, 1938 |
| 2,804,550 | Artzt | Aug. 27, 1957 |
| 2,965,712 | Pike | Dec. 20, 1960 |

OTHER REFERENCES

"Transistorized TV Cameras Using the Miniature Vidicon," R.C.A. Review, vol. 17, No. 4, December 1956, pages 469–502.